United States Patent [19]

Melden et al.

[11] Patent Number: 5,687,173

[45] Date of Patent: Nov. 11, 1997

[54] ADDRESSABLE HIGH SPEED COUNTER ARRAY

[75] Inventors: Kurt A. Melden, Westborough; Gregory Goss, Lowell, both of Mass.

[73] Assignee: Cascade Communications Corp., Westford, Mass.

[21] Appl. No.: 680,245

[22] Filed: Jul. 10, 1996

[51] Int. Cl.$^6$ .................................................. H04L 12/56
[52] U.S. Cl. ........................................................ 370/395
[58] Field of Search ................. 370/60, 60.1, 58.1–58.3, 370/94.1, 94.2, 94.3, 389, 395, 412, 413, 415, 428, 429; 395/425, 436

[56] References Cited

U.S. PATENT DOCUMENTS

| | | | |
|---|---|---|---|
| 4,849,968 | 7/1989 | Turner | 370/60 |
| 5,309,432 | 5/1994 | Kanakia | 370/60 |
| 5,548,588 | 8/1996 | Ganmukhi et al. | 370/60.1 |
| 5,557,610 | 9/1996 | Calamvokis et al. | 370/60.1 |

*Primary Examiner*—Douglas W. Olms
*Assistant Examiner*—Ajit Patel

*Attorney, Agent, or Firm*—Weingarten, Schurgin, Gagnebin & Hayes LLP

[57] ABSTRACT

Method and apparatus are disclosed for maintaining operational and statistical information in a high speed network switch for each of a plurality of supported connections. A high speed array is provided which includes a plurality of high speed registers for each of a plurality of connections supported by the switch. Upon receipt of a cell/frame, a connection identifier is generated to identify the connection within the network switch and the connection identifier is stored in an index register. The connection identifier stored within the index is used to select a plurality of registers within the high speed register array of registers pertaining to the specified connection. Information pertaining to each received cell/frame is generated upon receipt of the cell or retrieved from the respective cell header and is employed to generate an operand for each of the plurality of registers addressed by the connection identifier. Operands may allow for the clearing, setting, incrementing, decrementing or maintenance of the register contents. Each of the plurality of registers identified by the connection identifier is updated in parallel within the time frame associated with the receipt of a frame/cell.

12 Claims, 2 Drawing Sheets

ADDRESSABLE HIGH SPEED COUNTER ARRAY

FIELD OF THE INVENTION

The present invention relates to telecommunications and more specifically to high speed network switches.

BACKGROUND OF THE INVENTION

In the management of networks, such as Asynchronous Transfer Mode (ATM) networks, it is important to maintain operational and statistical information pertaining to each of the connections supported by a network switch. In particular, it is common to keep track of the number of cells transmitted between addressable nodes, errors, and special events occurring within the network. For example, in the ATM environment, it is desirable to keep track of the numbers of cells possessing a cell loss priority of 0 and 1 for each supported connection. Due to the increasing speeds of computer networks in the future, it will be increasingly important to maintain accurate information regarding network operation to efficiently manage network traffic.

To date, information gathering functions have been performed on a small scale via the use of discrete counters or on a larger scale through software. It is possible to maintain adequate information in networks such as ATM networks employing DS3 voice carrier systems having a 44.736 megabit per second data rate since at this data rate an ATM cell is received in approximately 9.47 microseconds (us). Within this timeframe register updates may be performed in software or microcode on a serial basis.

Optical carrier links, such as OC-12 and OC-48 however, have data rates of approximately 622 megabits per second and 2,488 gigabits per second respectively. At the data rate associated with an OC-12 communication link, an ATM cell would be received in approximately 681 nanoseconds (ns). At the data rate associated with an OC-48 communication link, an ATM cell would be received in approximately 177 nanoseconds (ns). Assuming further that it was desirable to maintain a register for each connection on eight different types information, it would be necessary to update a register in approximately 85 ns if the registers were serially processed in an OC-12 environment and in 22 ns if the registers were serially processed in an OC-48 environment. In such communication environments, using the presently known techniques, it would not be possible to maintain desired operational and statistical information on received cells or frames.

SUMMARY OF THE INVENTION

In accordance with the present invention a method and apparatus are disclosed for maintaining information pertaining to cells received at a network switch in a high speed network. A network array processor is provided which includes an addressable high speed register array. The network array processor includes an index register which is used to store a value identifying one of a plurality of network connections supported by the network switch. The addressable high speed register array includes a plurality of registers $R_1$ through $R_n$ for each supported connection and a particular plurality of registers is addressed by the value in the index register. The register array may comprise a static random access memory array or any other suitable high speed memory array. Thus, in a network switch supporting 1024 connections and having eight counters per supported connection, the high speed counter array would include 8192 registers (1024 by 8).

Additionally, the network array processor includes an operand register which has operand fields $O_1$ through $O_n$. Each operand register may contain a value which specifies the operation to be performed on the respective register $R_1$ through $R_n$ specified by the value within the index register. Operands are provided which permit the clearing of the respective register, setting of all bits within the selected register, incrementing the selected register, decrementing the selected register or the retention of the same value within the register.

Each register within the plurality of registers is designated as containing a particular data type. For example, one register may be reserved for counting the number of received cells for a particular connection, another register designated for retaining information on the number of cells received for the respective connection, another for counting errors associated with the connection, another for counting cells with a cell loss priority of zero (0) received for the specific connection and another for counting cells received at the switch which have a cell loss priority of one (1) or any other information which is deemed worth of retention for purposes of network management.

Upon receipt of a cell, the cell header is decoded and the connection identifier associated with the respective cell is stored in the index register. Additionally, operands are generated and stored in the respective operand fields $O_1$ through $O_n$ of the operand register based upon information derived from or associated with the received cell. Thereafter, each of the plurality of registers $R_1$ through $R_n$ for the respective connection is updated in parallel in accordance with an operand specified in the operand fields $O_1$ through $O_n$.

In the above-described manner, a large addressable high speed counter array is provided in which large volumes of operational information regarding received cells/frames may be accumulated in real time. The information within such array may be advantageously used in the network switch to efficiently manage the network traffic.

Additionally, one or more state values may be provided in the register array for each supported connection identifier. The state values may be single or multi bit values which have corresponding operand fields which provide at least for the clearing, setting or presetting of the respective state bits. The state values, for example, may be employed to indicate that the information pertaining to a particular connection is valid or to maintain any other state information via the use of the single or multi bit values in respective state value locations of the register array.

BRIEF DESCRIPTION OF THE DRAWINGS

The invention will be more fully understood by reference to the detailed description of the invention in conjunction with the following drawings of which.

DETAILED DESCRIPTION OF THE INVENTION

Figure 1:
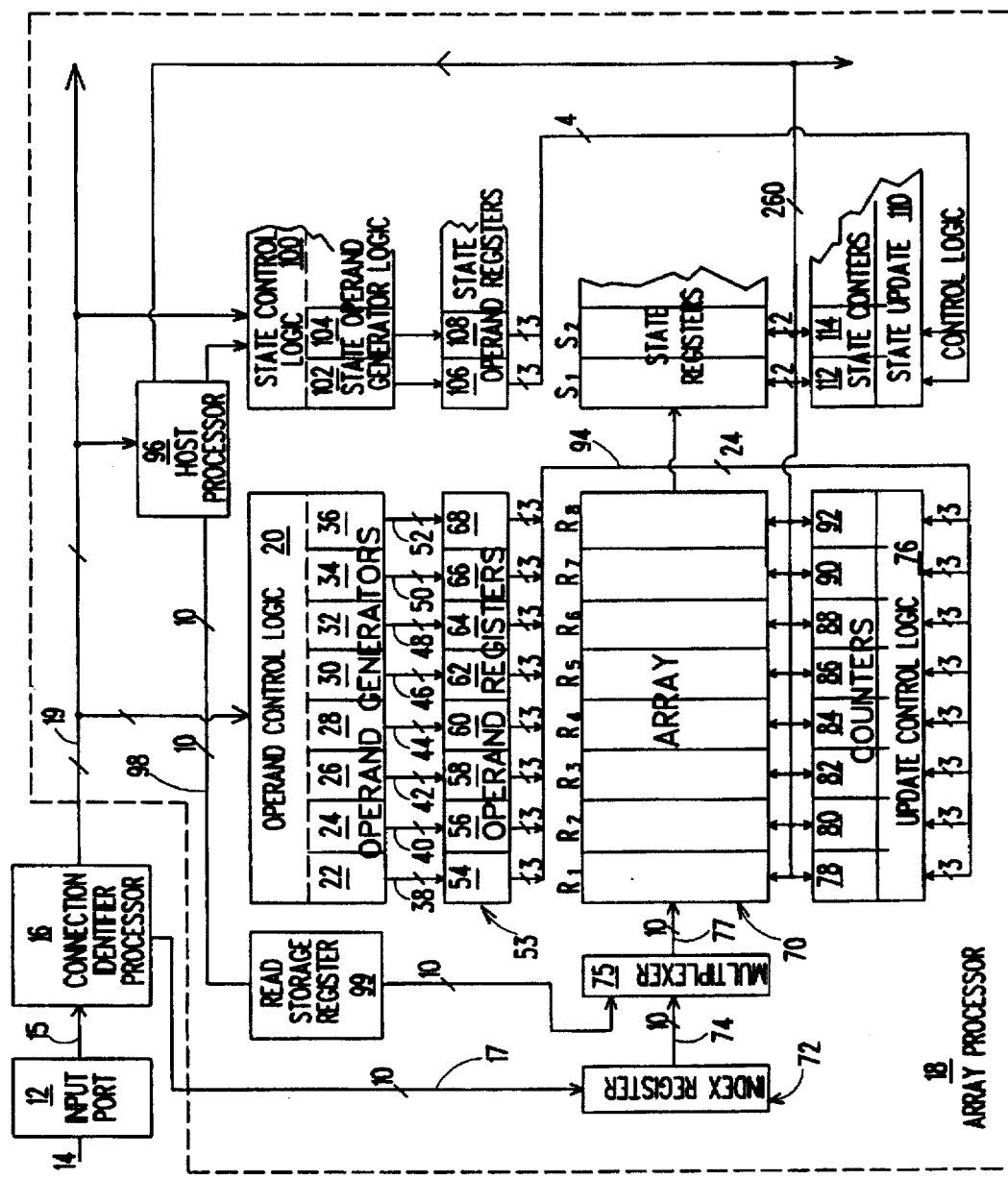
FIG. 1 is a block diagram of a high speed array processor for maintenance of operational data in accordance with the present invention.

In accordance with the present invention, a high speed network array processor is disclosed for maintenance of statistical and operational information pertaining to traffic flow within a network switch. More specifically, referring to FIG. 1, a network switch 10 includes at least one input port 12 for receiving cells or frames over a communication link 14. The received cell/frame is passed from the input port 12 to a connection identifier processor 16 which decodes header data in the received cell/frame and based upon the source and destination information contained within the cell/frame header, generates a connection identifier which serves to uniquely identify the connection within the network switch 10. Since the universe of possible source and destination addresses is usually a very large number, network switches only support a small subset of the possible connections and the supported connections are dynamically managed within the switch 10. For example, typical switches may support 1k to 16k connections.

The network switch 10 further includes a high speed register array processor 18 which is employed for storage of information pertaining to cells/frames received at the input port 12. The network array processor 18 includes operand control logic 20 which retrieves information from a respective cell or frame and, in conjunction with operand generation logic 22, 24, 26, 28, 30, 32, 34 and 36, generates operands which are forwarded over buses 38, 40, 42, 44, 46, 48, 50 and 52 for storage in an operand register 53 having operand fields $O_1$ through $O_8$ 54, 56, 58, 60, 62, 64, 66 and 68 respectively. In the presently disclosed embodiment, the operand buses are three bits wide and the operand fields $O_1$ through $O_8$ are likewise three bits wide thereby allowing for up to eight operands. It should be appreciated however, that a 2 bit operand field may be employed if a smaller number of operands are used or alternatively, a larger number of bits may be employed for the operand field if a larger number of operands must be supported.

A high speed register array 70 comprises a static ram of sufficient width to accommodate at least eight registers R1 through R8, each of which is 32 bits in width. The depth of the array 70 is at least equal to the number of connections supported by the switch 10 which, in the present exemplary embodiment, comprises 1024 connections. Thus, the register array 70 is 256 bits wide by 1024 bits in the present example.

The high speed array processor 18 further includes an index register 72 which is coupled to a multiplexer 75 via a bus 74. The output of the multiplexer 75 is coupled to the address input lines of the array 70 through a bus 77. The index register is 10 bits wide to accommodate a 10 bit address value necessary to support 1024 connections and the buses 74 and 77 are similarly 10 bits wide. The index register 72 is used to store the value of the connection identifier. The connection identifier is transmitted from the index register 72 output to the array address input lines through the multiplexer 75 and thus selects a plurality of registers $R_1$ through $R_8$ within the array for a specified connection.

The network array processor further includes update control logic 76 and counters C1 through C8 identified herein as 78, 80, 82, 84, 86, 88, 90 and 92 respectively.

Table I below indicates exemplary operand bit designations and table II indicates exemplary types of data for storage within the registers of the array 70.

TABLE I

| Operand | Bit Code |
|---------|----------|
| Clear   | 000      |
| Hold    | 001      |

TABLE I-continued

| Operand      | Bit Code |
|--------------|----------|
| Increment    | 010      |
| Decrement    | 011      |
| Set all bits | 111      |

TABLE II

| Register | Data Scored |
|----------|-------------|
| $R_1$    | Cells received |
| $R_2$    | $CLP_0$ |
| $R_3$    | $CLP_1$ |
| $R_4$    | $CLP_{0+1}$ |
| $R_5$    | $PT_1$ |
| $R_6$    | Congestion |
| $R_7$    | OAM cell count |
| $R_8$    | |

As a cell, such as an ATM cell, is received over the communication link 14 at the input port 12 of the network switch 10, cell header information is forwarded from the input port 12 to the connection identifier processor 16 over bus 15 and the connection identifier processor 16 derives a 10 bit connection identifier from the source and destination address information contained within the cell header. The 10 bit connection identifier is forwarded by the connection identifier processor 16 over bus 17 for storage in the index register 72 which comprises a 10 bit register. The output of the index register 72 is coupled to the address input lines of the array and serves to select one of 1024 groups of registers $R_1$ through $R_7$ associated with the respective connection. The cell header for the received cell is also forwarded from the connection identifier processor 16 to the operand control logic 20 over bus 19 which, in conjunction with the operand generators 22, 24, 26, 28, 30, 32, 34 and 36, generates operands employed to control the updating of the respective registers $R_1$ through $R_8$ specified by the connection identifier stored within the register 72. More specifically, upon receipt of a cell, the operand control logic 20 in conjunction with the operand generator 22 generates an operand '010' at the output of the generator 22 and transmits such operand over bus 38 for storage in the operand field 54 of operand register 53. The operand '010', as indicated in Table I, indicates that the register $R_1$ is to be incremented. Additionally, if the received cell contained a cell loss priority (CLP) bit of '1' indicating that the cell is subject to being discarded by the network, the operand control logic 20 in conjunction with the operand generator 26 would generate an operand '010' which would be transmitted over the bus 42 for storage in operand field 58 of the operand register 53. Furthermore, since in the present example, the CLP bit was not a 0, the $CLP_0$ register would not be updated. Accordingly, the operand control logic 20 in conjunction with the operand generator 24 would produce an operand '001' indicating that the value of the register $R_2$ for the specified connection should be maintained. The operand is transmitted over the bus 40 for storage in the operand field 56 of the operand register 53. In a similar manner, operands are generated and stored in each of the plurality of operand fields of the operand register 53.

After generation of the operands and storage of the operands in the respective fields $O_1$ through $O_8$ of the operand register 53, the operands are transmitted over bus 94 to update control logic 76. In the present embodiment the bus 94 comprises a 24 bit data bus plus associated control signals. The contents of the registers $R_1$ through $R_8$ for the connection identified by the connection identifier stored in the index register 72 are read out of the array 70 and stored in respective counters $C_1$ through $C_8$ designated herein as 78, 80, 82, 84, 86, 88, 90 and 92 respectively. Thus, in the present example, the contents of the register $R_1$ containing the number of cells received for the connection specified by the value in the index register would be read and stored in the counter $C_1$, the contents of the register $R_2$ containing a value identifying the number of cells received for the respective connection having a CLP of '0' would be read from the array and stored in counter $C_2$ and the contents of the register $R_3$ containing a value identifying the number of cells received for the respective connection having a CLP of '1' would be read from the array and stored in counter $C_3$. Similarly, the contents of the remaining registers $R_4$ through $R_8$ would be read from the array 70 and stored in the respective counters $C_4$ through $C_8$.

The update control logic 76 next causes each of the counters $C_1$ through $C_8$ to be modified in accordance with the respective operands. More specifically, the counters $C_1$ through $C_8$ are updated substantially simultaneously in accordance with the corresponding operand received over bus 94 at the operand control logic 76. By way of illustration, in the above referenced example, the counter $C_1$ containing the received cell count for the respective connection would be incremented since the operand specified is '010', the counter $C_2$ containing the number of cells received having a CLP bit equal to '0' would be unchanged since the operand specified is '001' and the counter CLP containing the number of cells received having a CLP bit equal to 1 would be incremented since the operand specified is '010'.

After updating of the contents of the counters, the updated counter contents are written back to the respective registers $R_1$ through $R_8$ of the array 70 specified by the index register 72.

In the above described manner, statistical and operational information pertaining to network switch traffic may be accurately maintained even when cells are received at 622 megabits per second data rate or above.

The data stored in the high speed register array 70 may be read out of the array, which in FIG. 1 is depicted as a single port random access memory. When it is desired to read data out of the register array, a host processor 96 transmits an address to the read storage register 99 via bus 98. The output of the read storage register 99 is coupled to the multiplexer 75 through a bus 97 and the output of the multiplexer 75 is coupled to the address input lines of the array 70 through the multiplexer output bus 77. Data stored in the registers $R_1$ through $R_8$ may be read out in parallel substantially simultaneously so that an accurate picture of the data stored within the register for a given connection may be obtained at a given instant in time. It is noted that if the data within the array is read out of the various registers sequentially, the data within some of the registers may have changed due to the receipt of subsequent cells by the time all of the register contents have been read.

Alternatively, to minimize the width of the data output interface of the array 70, the data stored in array 70 may be read out, for example, in successive read operations. In the first read operation, the least significant byte of each of the registers $R_1$ through $R_8$ is accessed and in three additional read operations the more significant bytes of the respective registers are accessed. In such manner, the width of the output bus is reduced fourfold. Since the great majority of changes to the registers are likely to be found in the least significant byte, most changes to the registers may be observed without access to the more significant bytes. The more significant bytes may be accessed upon recognition that a register has been incremented and that the incremented has effected the register across a byte boundary.

To facilitate data read out from the high speed register array 70 without impacting the updating of the array, the array may be provided as a dual ported array. In such event, the address bus 97 is coupled to one set of address input lines of the array 70 to specify one set of registers for a read access and the address bus 74 is coupled to a second set of address input lines of the array 70 to specify a second set of registers for updating within the array.

In addition to the registers $R_1$ through $R_8$, the network array processor may include one or more state registers S1 through Sn for each of the connections supported by the switch. To permit setting and resetting of the state registers, the array processor 18 includes state control logic 100 and state operand generator logic 102, 104, etc. for generating, in the present example, at least two operands which are transmitted over respective buses and stored in state operand registers 106 and 108. In the preferred embodiment, the state registers S1, S2, etc. are single bit registers for storage of indicators. For example, the state register S1 may contain a valid indicator bit to denote that the data for the respective connection is valid and may be used, (fill in other indicators that might be used). Alternatively, the state registers S1, S2, etc. may comprise multi-bit registers if further granularity to operational state information within the network switch is desired.

The array processor 18 further includes state update control logic 110 and state counters or update registers 112, 114 for receiving information read out of the state registers in the event that the registers S1 and S2 are to be modified through a read-modify-write cycle. It should be appreciated that if the state registers S1 and S2 are merely intended to set or reset, the state 110, 112 may be dispensed with.

The state registers S1, S2, etc. may be provided as an extension of the array 70 and stored in a common static ram array or alternatively, be stored in a separate random access memory. In either event the array 70 and the state register array are indexed by the value of the connection identifier contained in index register 72 so that all contents of the registers for a particular connection as well as state information for a particular connection may be simultaneously accessed.

Figure 2:
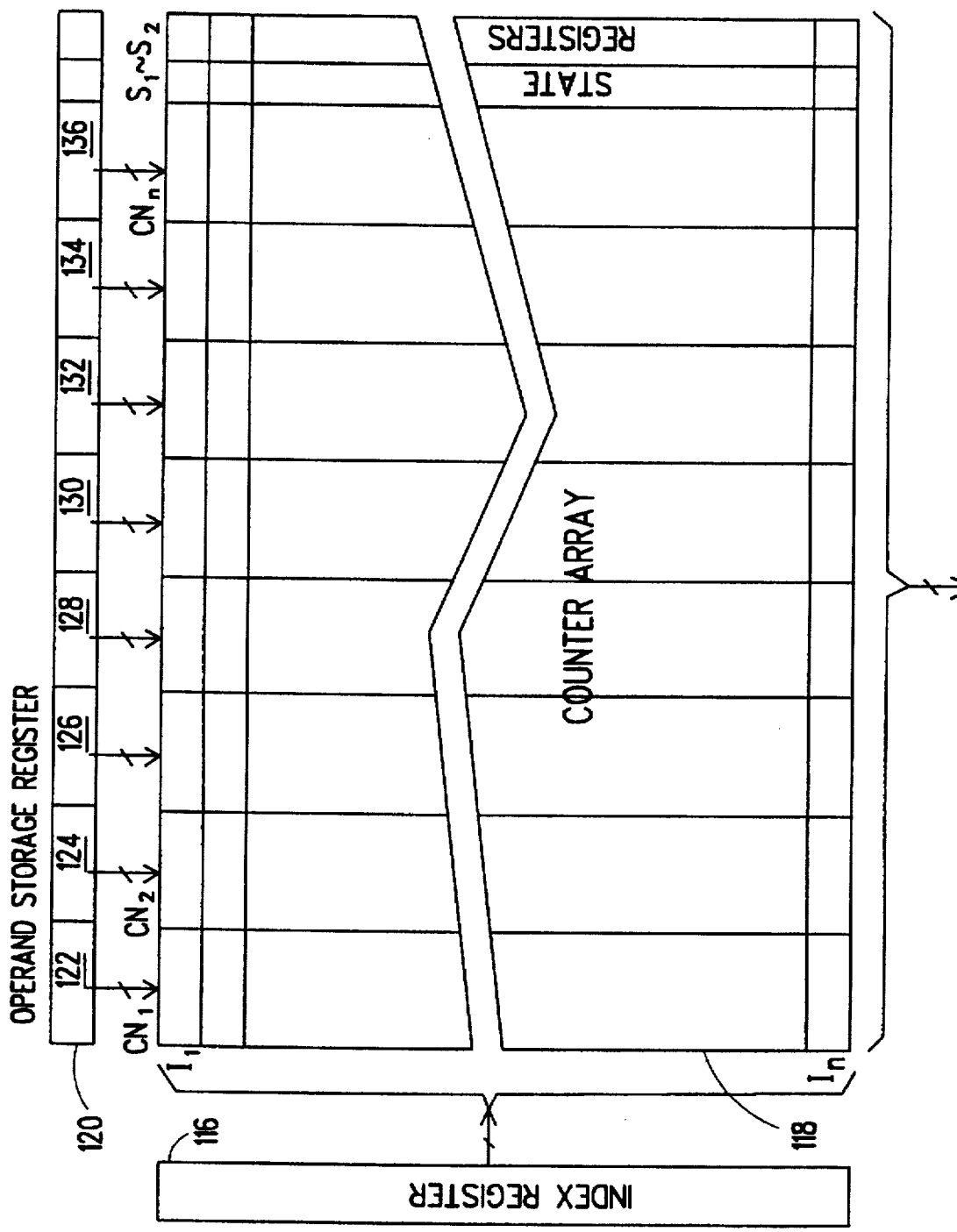
FIG. 2 is an alternative embodiment of a high speed register array for use in the high speed network array processor of FIG. 1.

An alternative embodiment of the present invention is illustrated in FIG. 2 in which the array comprises an array of counters. While more complex, the embodiment of FIG. 2 permits faster update of the contents of the registers and thus, use of the presently disclosed technique to store information associated with cells received at higher communication link data rates than would be achievable with the FIG. 1 embodiment.

More specifically, referring to FIG. 2, the network array processor includes an index register 116 which receives a connection identifier in the manner hereinabove described with respect to FIG. 1. The index register 116 is employed to select a plurality of counters $C_1$ through $C_n$ within a counter array 118 corresponding to counters for the specified connection. The index register 116 also addresses state registers S1 and S2 associated with a specific connection.

Operands are generated in the manner hereinabove described with respect to operand control logic 20 and operand generators 22, 24, 26, 28, 30, 32, 34 and 36 and are stored in operand storage register 120 which includes operand storage fields $OS_1$ through $OS_8$ identified herein as fields 122, 124, 126, 128, 130, 132, 134 and 136. Each of the counters $C_1$ through $C_8$ is updated substantially simultaneously based upon the operand specified in the respective operand storage field of the operand storage register 120. As a consequence of the fact that the array 118 comprises a counter array the selected plurality of counters for a specific connection may be directly updated without the delays introduced via the read-modify-write cycle employed in the embodiment of FIG. 1. Thus, the FIG. 2 array embodiment may be utilized in conjunction with faster communication links than are realizable with the embodiment of FIG. 1.

While the presently disclosed network array processor has been primarily discussed with regard to use in an Asynchronous Transfer Mode switch, it is appreciated that such processor may be employed in any communication switch and with any protocol where it is desirable to maintain operational data pertaining to received cells, packets or frames.

The above described methods and apparatus are illustrative of a novel array processor which permits maintenance of statistical and operational information regarding cell/traffic flow in a network switch at extremely high cell rates. Other modifications, embodiments and departures from the present disclosure will be apparent to those skilled in the art without departing from the inventive concepts contained herein. Accordingly, the invention is to be viewed as embracing each and every novel feature and novel combination of features present in or possessed by the techniques and apparatus herein disclosed and is to be viewed as limited solely by the scope and spirit of the appended claims.

What is claimed is:

1. A high speed register processor for maintenance of information in a computer network switch supporting a plurality of connections comprising;

a register array having a plurality of registers $R_1$ through $R_n$ for each of said plurality of connections;

an index register containing an index value identifying one of said plurality of registers;

an operand register having a plurality of operand fields $O_1$ through $O_n$ for storing a plurality of operands, each operand defining an operation to be performed upon the contents of respective registers $R_1$ through $R_n$; and a register update controller for performing, substantially simultaneously, the operations specified by the operand fields $O_1$ through $O_n$ on the respective registers $R_1$ through $R_n$ identified by said index value contained within said index register.

2. The high speed register controller of claim 1 wherein said register controller further includes at least one state register for each of said plurality of connections, said operand register includes at least one operand field $O_{n+1}$, and said register update controller is operative to perform the operation specified by said at least one operand field $O_{n+1}$ on said at least one state register for the connection specified by the value contained in the index register substantially simultaneously with the performance of said operations specified by said operands $O_1$ through $O_n$ upon said registers $R_1$ through $R_n$ respectively.

3. The high speed register controller of claim 1 wherein said register update controller causes the contents of each of the plurality of registers $R_1$ through $R_n$ associated with a connection specified by the value within said index register to be cleared, incremented, decremented or maintained based upon the values of the operands in the respective operand fields of said operand register.

4. The high speed register controller of claim 1 wherein said register update controller is operative to cause the contents of each of the registers $R_1$ through $R_n$ to be read, operated upon in accordance with the operand specified in the corresponding operand field $O_1$ through $O_n$ and written back to the respective register of the register array for a connection specified by the value within the index field within a time period no greater than the time for receipt of one data packet at said network switch over a communication link.

5. The high speed register controller of claim 1 wherein each of said registers $R_1$ through $R_n$ is m bits wide and said register array has an output bus (n)×(m) bits wide to permit data within all of the registers for a connection identified by said index field to be read in parallel.

6. A method for maintaining communications information in a high speed network switch receiving packets over at least one communications link, comprising the steps of:

receiving a packet at said network switch;

determining a connection identifier for said received packet;

decoding information contained within said received packet to generate a plurality of operands $O_1$ through $O_n$;

storing said plurality of operands in an operand register having n operand fields; and operating substantially simultaneously on the data contained within a plurality of registers $R_1$ through $R_n$ in a register array wherein said plurality of registers within said array is specified by said connection identifier, and the operation performed on each of the values within the registers $R_1$ through $R_n$ is based upon the values of the operands $O_1$ through $O_n$ contained within the respective operand fields of said operand register.

7. The method of claim 6 wherein said decoding step includes the step of generating a value for each of said plurality of operands $O_1$ through $O_n$ which causes the value within each of the respective plurality of registers $R_1$ through $R_n$ to be cleared, maintained, incremented or decremented.

8. The method of claim 6 wherein said receiving step includes the step of receiving said packet within a predetermined maximum packet reception time and said operating step includes the step of updating said plurality of registers $R_1$ through $R_n$ within said maximum packet reception time.

9. The method of claim 6 wherein each of said plurality of registers in said register array has a parallel output bus and said method further includes the step of reading the output buses of said plurality of registers in parallel for a specified connection identifier.

10. The method of claim 6 wherein said packet comprises a cell.

11. The method of claim 10 wherein said cell comprises an Asynchronous Transfer Mode (ATM) cell.

12. The method of claim 6 wherein said packet comprises a frame.

* * * * *